(12) United States Patent
Sauvinet

(10) Patent No.: US 8,746,623 B2
(45) Date of Patent: Jun. 10, 2014

(54) METHOD AND DEVICE FOR GENERATING AN OPTIMUM AERODYNAMIC CONFIGURATION OF AN AIRCRAFT DURING A FLIGHT

(75) Inventor: Frédéric Sauvinet, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 599 days.

(21) Appl. No.: 12/713,782

(22) Filed: Feb. 26, 2010

(65) Prior Publication Data

US 2010/0219298 A1 Sep. 2, 2010

(30) Foreign Application Priority Data

Mar. 2, 2009 (FR) ...................... 09 00925

(51) Int. Cl.
*G05D 1/08* (2006.01)
(52) U.S. Cl.
USPC ........................... 244/181; 244/183; 244/186
(58) Field of Classification Search
USPC ................ 244/183, 186, 213, 90 R
See application file for complete search history.

(56) References Cited

U.S. PATENT DOCUMENTS

| 3,589,648 A * | 6/1971 | Gorham et al. ............. 244/186 |
| 4,042,197 A * | 8/1977 | Boyle et al. ................. 244/183 |
| 4,106,730 A * | 8/1978 | Spitzer et al. .............. 244/183 |
| 7,366,592 B2 * | 4/2008 | Delaplace et al. ............ 701/4 |
| 2005/0242243 A1 * | 11/2005 | Seve ............................ 244/213 |
| 2007/0170313 A1 | 7/2007 | Delaplace |
| 2007/0176051 A1 | 8/2007 | Good et al. |
| 2009/0023394 A1 | 1/2009 | Ulloa-Sanzo et al. |
| 2009/0230253 A1 * | 9/2009 | Delaplace et al. ......... 244/90 R |

FOREIGN PATENT DOCUMENTS

| FR | 2873094 | 1/2006 |
| WO | WO 2007/074173 | 7/2007 |

* cited by examiner

*Primary Examiner* — Tien Dinh
*Assistant Examiner* — Justin Benedik
(74) *Attorney, Agent, or Firm* — Novak Druce Connolly Bove + Quigg LLP

(57) ABSTRACT

A process and device for the automatic flight optimization of the aerodynamic configuration of an aircraft.
The device (1) includes means (7, 8, 10) for determining and applying to the spoilers (6) of the aircraft commands for providing the aircraft with an optimum aerodynamic configuration.

4 Claims, 3 Drawing Sheets

METHOD AND DEVICE FOR GENERATING AN OPTIMUM AERODYNAMIC CONFIGURATION OF AN AIRCRAFT DURING A FLIGHT

CROSS-REFERENCE TO RELATED APPLICATIONS

This application claims priority to French Patent Application 0900925, filed Mar. 2, 2009, the entire contents of which are incorporated herein by reference.

FIELD OF THE INVENTION

This invention relates to a process and device for automatic optimisation, while flying, of an aerodynamic configuration of an aircraft, particularly a cargo aircraft, which is equipped with wings provided with spoilers. These spoilers can be deflected downwards when flaps of the aircraft are in deflected position.

BACKGROUND OF THE INVENTION

It is known that the aerodynamic configuration of an aircraft corresponds to a particular combination of positions of mobile members of an aircraft, such as the landing gear or aerodynamic surfaces arranged on the wings (flaps, ailerons, spoilers, . . . ), the aerodynamic characteristics of the aircraft depend upon. From document WO-2007/074173, means for monitoring landing flaps of a wing profile of an aircraft are known, and from document FR-2899405, means for automatically controlling spoilers are known.

Usually, when designing the aerodynamic configurations of an aircraft, the aim is to optimise fineness, i.e. the ratio of the airlift to the drag, for takeoff. In contrast, for an approach phase, the goal is to achieve maximum airlift.

Upon designing aerodynamic configurations, it is therefore required to select a priori desired parameters for optimisation. In accordance, an optimum operation is not ensured in all flight phases.

SUMMARY OF THE INVENTION

The need for optimisation of aerodynamic configuration is not the same according to flight cases. In particular, what is needed is:

a high maximum airlift, for near-stalled conditions and only for these conditions, that is with high incidence;

a minimised noise, only in rated operation conditions; and a high fineness, for ensuring good lifting performance to the aircraft, that is outside the stalled phases.

The object of this invention is to overcome such drawbacks. The invention relates to a process for automatically optimising, while flying, the aerodynamic configuration of an aircraft equipped with wings which are provided with spoilers (likely to be deflected downwards when flaps of the aircraft are in deflected position), in order to provide an overall optimisation of the aircraft operation in any flight phase.

For this purpose, according to the invention, said process is noticeable in that, in an automatic fashion:

I) the aircraft is monitored to determine the current flight phase, and if the current flight phase corresponds to a particular predetermined flight phase, the following operations are performed:

II/a) optimum engine angle commands are taken into account, each of which relates to the deflection of spoilers and is optimised to provide the aircraft with an aerodynamic configuration for optimising a particular parameter (fineness, airlift, noise) in said particular flight phase;

b) the current value of incidence of the aircraft is determined; and c) using this current value and said predetermined optimum engine angle commands, a correct engine angle command is determined which, when applied to said spoilers, provides the aircraft with an optimum aerodynamic configuration for the current situation of the aircraft (current flight phase, current incidence).

Preferably, a further step II/d) is additionally carried out, wherein said current engine angle command, determined in step II/c) is automatically applied to usual actuators of spoilers of the aircraft.

Thus, with the invention, the aerodynamic configuration of the flying aircraft is optimised by acting exclusively on the spoilers which are mounted to the wings of said aircraft. Such optimisation is carried out taking into account the flight phase (takeoff, approach) and the incidence, and parameter (fineness, airlift, noise) having to be optimised as a priority according to these data. In accordance, a process is achieved wherein an optimum configuration in each considered flight phase can be ensured, by optimising the priority parameter in the current flight phase.

Further, as such optimisation is automatically implemented, the process according to the invention does not increase the workload on the aircraft pilots.

Besides, in a particular embodiment, the additional following operations are further carried out:

the engines of the aircraft are monitored in order to be able to detect a potential breakdown of one of said engines; and in case a breakdown of an engine of the aircraft is detected, an optimum engine angle command in step II/a) is taken into account, as set out below.

Further, advantageously, in step II/c), said current engine angle command is determined using said current value of incidence and a predetermined curve which shows the engine angle command as a function of incidence. This predetermined curve includes optimum engine angle commands and transitions between such optimum engine angle commands. Preferably, said transitions are continuous and monotonic.

In a first situation, wherein said particular flight phase is an approach phase, the following is determined as the current engine angle command:

for an incidence lower than a first predetermined value (corresponding, for example, to a usual protection incidence), a first optimum engine angle command providing the aircraft with an aerodynamic configuration for optimising noise;

for an incidence higher than a second predetermined value which is higher than said first predetermined value, a second optimum engine angle command providing the aircraft with an aerodynamic configuration for optimising airlift; and for an incidence between said first and second predetermined values, a command which is between said first and second optimum engine angle commands.

Further, in a second situation, for which said particular flight phase is a takeoff phase, the following is determined as the current engine angle command:

for an incidence lower than a first predetermined value (corresponding, for example, to a usual protection incidence), a first optimum engine angle command providing the aircraft with an aerodynamic configuration for optimising noise, in the absence of any engine breakdown; and optimising fineness upon a breakdown of an engine of the aircraft;

for an incidence higher than a second predetermined value which is higher than said first predetermined value, a second optimum engine angle command providing the aircraft with an aerodynamic configuration for optimising airlift; and for an incidence between said first and second predetermined values, a command which is between said first and second optimum engine angle commands.

This invention also relates to a device for automatically optimising, while flying, the aerodynamic configuration of an aircraft, particularly a cargo aircraft, which is equipped with wings provided with spoilers. These spoilers can be deflected downwards when flaps of the aircraft are in deflected position.

According to the invention, said device is noticeable in that it includes:

first means for automatically determining the current flight phase (takeoff, approach) of the aircraft;

second means for automatically determining the current value of incidence of the aircraft; and third means for automatically determining a current engine angle command which, when applied to said spoilers, enables to provide the aircraft with an optimum aerodynamic configuration for the current situation of the aircraft, said third means determining said current engine angle command using said current value and predetermined optimum engine commands, each of which relates to the deflection of spoilers and is optimised to provide the aircraft with an aerodynamic configuration for optimising a particular parameter (fineness, airlift, noise) in a particular flight phase; as well as actuators for automatically applying to the spoilers of the aircraft said current engine angle command, determined by said third means.

The device according to the invention therefore enables the spoilers to be automatically brought to an optimum position in order to optimise a particular parameter (fineness, noise, airlift), depending on the current flight phase and incidence (and/or an engine breakdown) information.

This invention also relates to an aircraft which is provided with an automatic optimisation device, such as the one mentioned above.

BRIEF DESCRIPTION OF THE DRAWINGS

The figures of the appended drawings will help better understand how the invention can be implemented. In these figures, the same characters designate similar elements.

DETAILED DESCRIPTION

Figure 1:
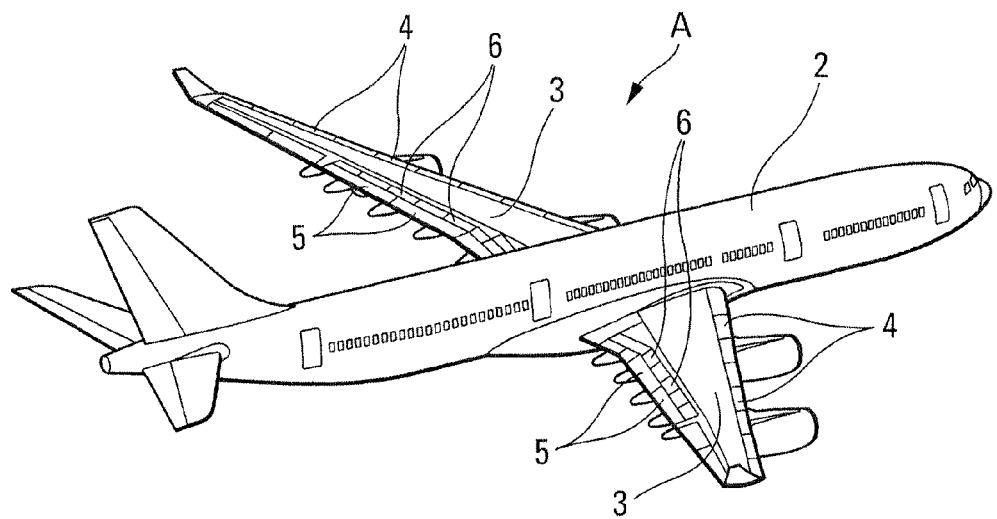
FIG. 1 is a perspective view of a wide-body civilian aircraft, to which a device according to the invention is applied.
Figure 2:
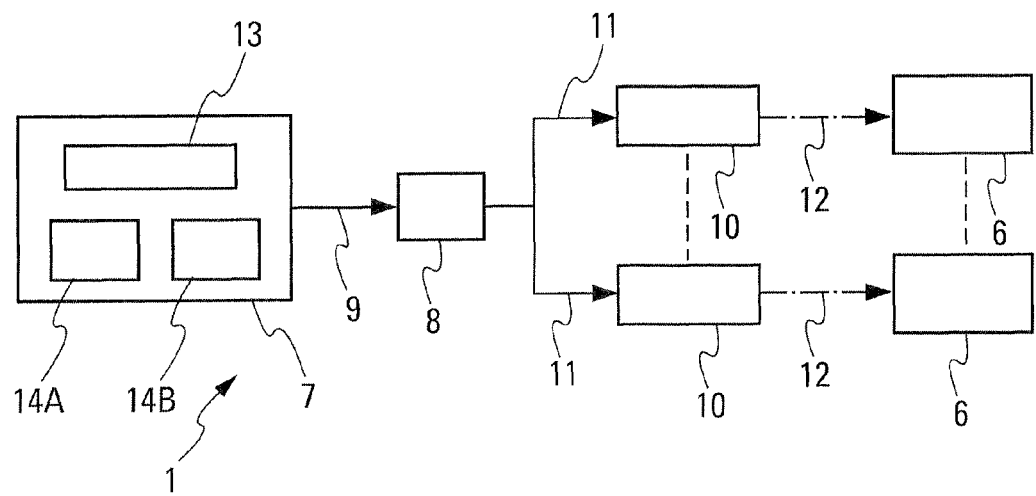
FIG. 2 is a block diagram of an automatic optimisation device according to the invention.

The device 1 according to the invention and schematically represented in FIG. 2 provides automatic optimisation while flying, of the aerodynamic configuration of an aircraft A as shown, for example, in FIG. 1. The aircraft A of FIG. 1 is a wide-body civilian aircraft which includes a fuselage 2, provided on either side with two symmetric wings 3. Each wing 3 comprises a plurality of aerodynamic surfaces, including hyperlifting noses for the leading edge 4, hyperlifting flaps for the trailing edge 5 and spoilers 6. It is known that the aerodynamic configuration of an aircraft A corresponds to a particular combination of positions of mobile members of said aircraft A, such as the landing gear or the aerodynamic surfaces arranged on the wings 3 (flaps 5, ailerons, spoilers 6, . . . ), the aerodynamic characteristics of said aircraft A depend upon.

According to the invention, the device 1 in accordance with the invention automatically optimises, while flying, the aerodynamic configuration of the aircraft A, by acting exclusively on the spoilers 6 of said aircraft A. These spoilers 6 are formed such that they can be deflected downwards when flaps of the aircraft A are in deflected position. For that purpose, said device 1 includes, as shown in FIG. 2:

a set 7 for determining a current engine angle command usually representing a current deflection angle to be applied to said spoilers 6;

a unit 8 which is connected through a link 9 to said set 7 and intended to transmit, through the links 11, the engine angle command received from said set 7 to a plurality of usual actuators 10 of the spoilers 6. This engine angle command received from said set 7 corresponds to a deflection angle which is optimised for the current situation of the aircraft A, as set out below. In particular, the unit 8 can break down this engine angle command, which can be an overall command, into individual commands respectively for the different actuators 11; and said spoilers 6 which are deflected in an usual way, by being brought to particular deflection angle values, through said associated actuators 11, as illustrated by the links 12 in chain dotted lines.

Figure 3:
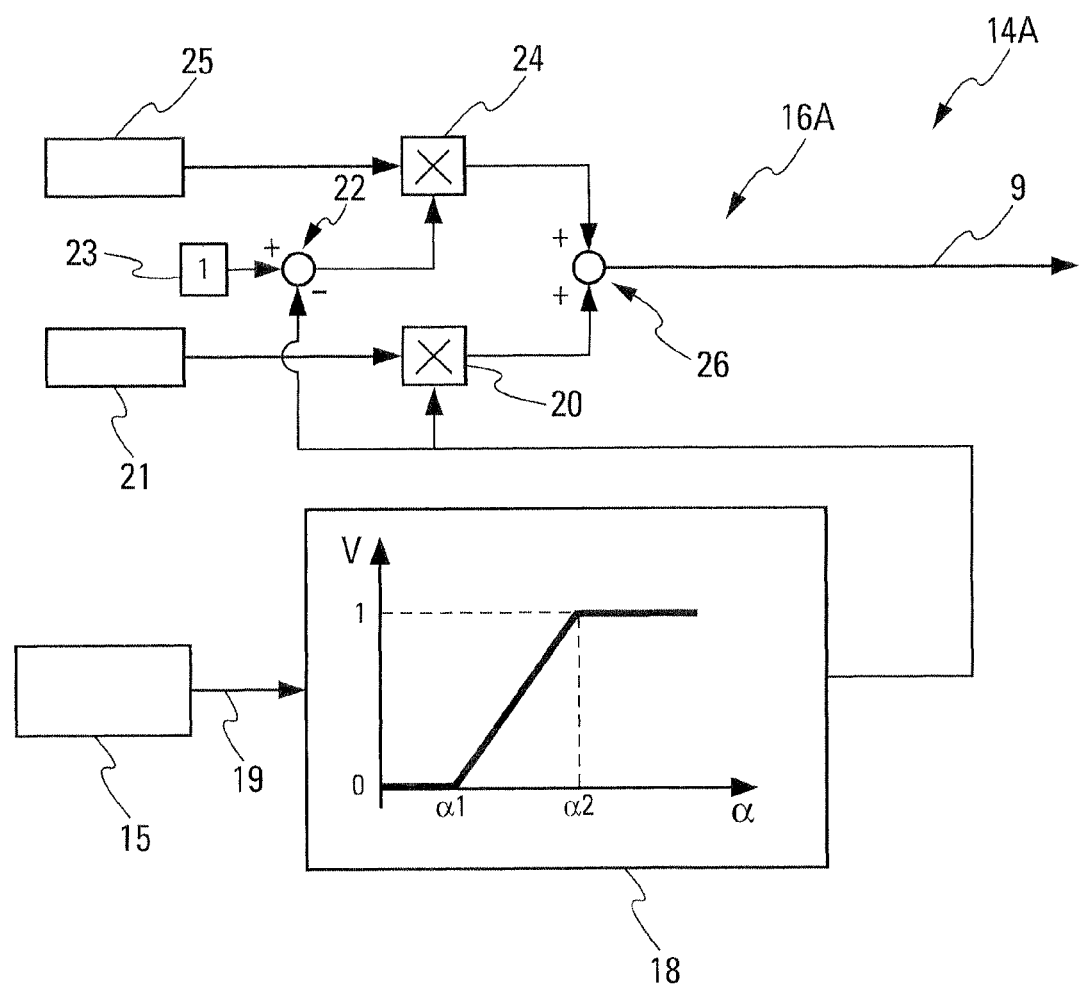
FIGS. 3 and 4 are block diagrams of two different embodiments of a calculation set being part of an automatic optimisation device according to the invention.
Figure 4:
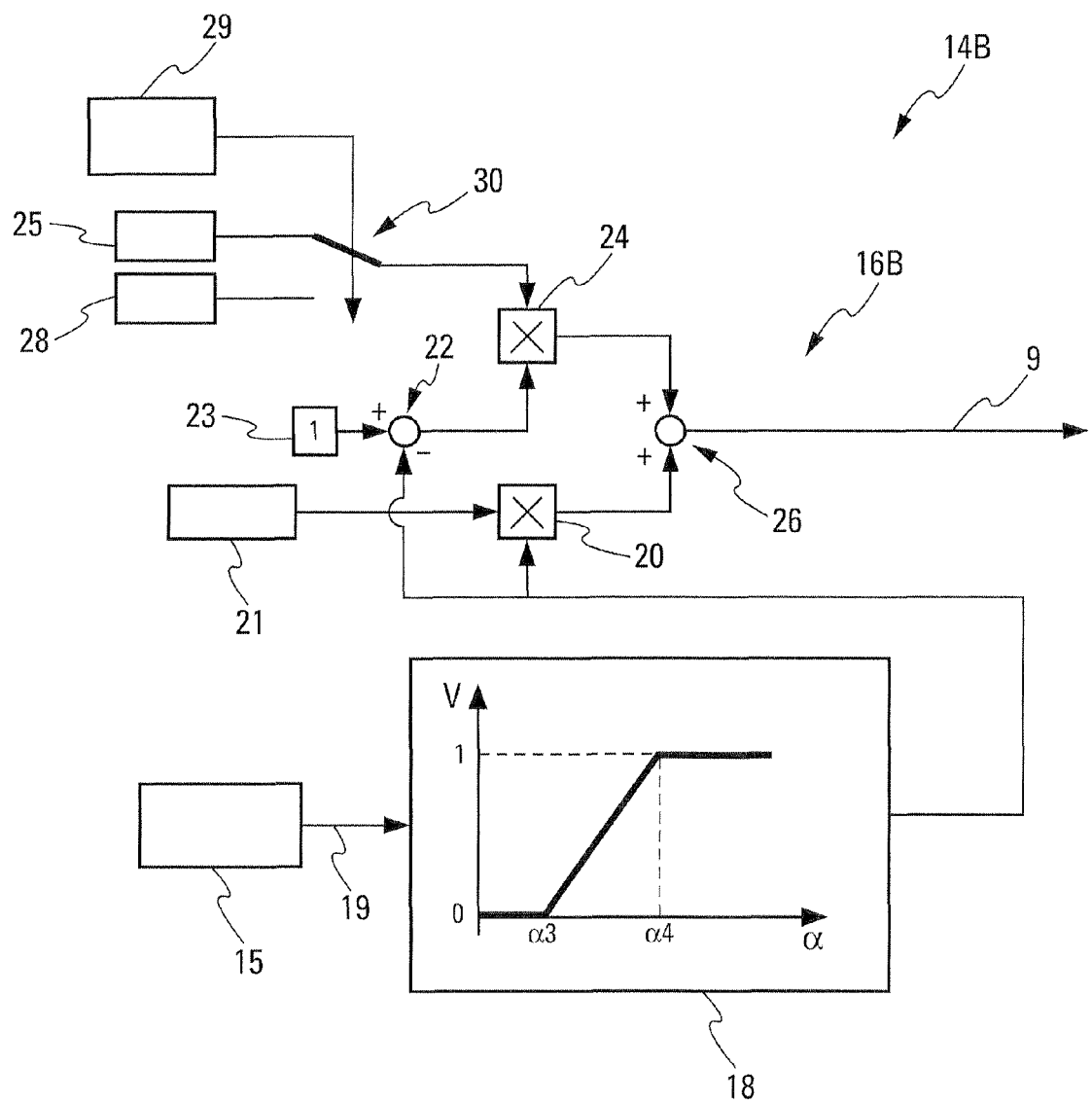

According to the invention, said set 7 of the device 1 includes:

means 13 for automatically determining the current flight phase of the aircraft A. within the scope of the present invention, this is substantially the takeoff phase and the approach phase (for landing); and calculation sets 14A, 14B, each of which is associated with a particular flight phase. The calculation set 14A which is shown by way of example in FIG. 3 is applied to an approach phase, whereas the calculation set 14B which is shown in FIG. 4 is applied to a takeoff phase.

According to the invention, a calculation set 14A, 14B includes:

usual means 15, for automatically determining the current value $\alpha c$ of incidence $\alpha$ of the aircraft A; and means 16A, 16B for automatically determining a current engine angle command $\delta sc$, which, when applied to said spoilers 6, provides the aircraft A with an optimum aerodynamic configuration for the current situation (current flight phase, current incidence) of said aircraft A. Said means 16A, 16B determine said current engine angle command $\delta sc$ using said current value $\alpha c$ (received from means 15) and predetermined optimum engine angle commands. Each of said optimum engine command relates to the deflection of the spoilers 6 and is optimised to provide the aircraft with an aerodynamic configuration for optimising a particular parameter (fineness, airlift, noise) in a particular flight phase, as explained below.

Thus, optimising the aerodynamic configuration of the aircraft A while flying is carried out the device 1 in accordance with the invention, by taking into account the flight phase (takeoff, landing) and because the parameter (set out below) which should be optimised as a priority depends on the current flight phase and the current incidence. In accordance, it is obtained a device 1 showing, by exclusively acting on the spoilers 6 which are mounted onto the wings 3 of the aircraft A, an optimum configuration in each considered flight phase, by optimising the priority parameter in the current flight phase.

Further, since this optimisation is implemented automatically by the device 1 in accordance with the invention, this invention does not increase the workload on the pilots of the aircraft A.

Besides, in a particular embodiment, the device 1 includes, in addition, means for:

monitoring the engines of the aircraft A such that a possible breakdown of one of said engines can be detected; and in case an engine breakdown is detected, taking into account a suitable optimum engine angle command.

Within the scope of the present invention, at least three parameters can be optimised, each time with a different deflection of the spoilers 6, which adapts the aerodynamic configuration of the airfoil (that is said wings 3) to said parameter to be optimised. These parameters are:

fineness which corresponds to the airlift to drag ratio. Optimising this parameter results in good lifting performance, particularly upon a breakdown of an engine of the aircraft A. Such optimisation is particularly very advantageous for a twin-engine aircraft which loses half of its thrust upon an engine breakdown;

maximum airlift, in order to obtain the lowest possible approach speed; and noise.

To each of the previous parameters is associated a predetermined optimum engine angle command, that is:

$\delta sf$, for fineness;

$\delta scz$, for maximum airlift; and $\delta sbr$, for noise.

These optimum engine angle commands $\delta sf$, $\delta scz$ and $\delta sbr$ are known and usually depend on the characteristics of each aircraft A. These commands can readily determined in an experimental way, in particular by a flight test or by tunnel tests.

In the particular embodiment of FIG. 3 which is provided for an approach phase, said calculation set 14A includes:

a comparison means 18 which compares the current value $\alpha c$ of incidence $\alpha$, received from said means 15 through a link 19, with predetermined $\alpha 1$ and $\alpha 2$ values, set out below. This comparison means 18 transmits a value V between 0 and 1, depending on the current incidence value $\alpha c$ with respect to said predetermined values $\alpha 1$ and $\alpha 2$. More precisely:

V=0 when $\alpha c < \alpha 1$;

V=1 when $\alpha c > \alpha 2$; and

V linearly ranges between 0 and 1 when $\alpha c$ varies from $\alpha 1$ to $\alpha 2$;

a computing means 20 which multiplies the optimum engine angle command $\delta scz$ received from a means 21, for example a memory, by the V value (between 0 and 1) received from said means 18;

a computing means 22 which computes the difference between a "1" value received from an element 23, for example, a memory, and the V value received from said means 18;

a computing means 24 which multiplies the optimum deflection angle $\delta sbr$ received from a means 25, for example, a memory, by the difference transmitted by said computing means 22; and a computing means 26 which sums the results from said computing means 20 and 24, and transmits the sum as the current engine angle command $\delta c$ through the link 9 to the unit 8.

In accordance, in this embodiment of FIG. 3 which is implemented in a situation for which the current flight phase (determined by means 13) of the aircraft A is an approach phase, the device 1 determines and applies as the current engine angle command $\delta sc$:

for an incidence $\alpha c$ lower than the value $\alpha 1$ (corresponding for example to a usual incidence of protection onset), an optimum engine angle command $\delta sbr$ providing the aircraft A with an aerodynamic configuration for optimising noise;

for an incidence $\alpha c$ higher than $\alpha 2$ value (which is higher than said $\alpha 1$ value, for example of a predetermined value), an optimum engine angle command $\delta scz$ providing the aircraft A with an aerodynamic configuration for optimising airlift; and for an incidence $\alpha c$ between said values $\alpha 1$ and $\alpha 2$, a command $\delta sc$ which is between said optimum engine angle commands $\delta sbr$ and $\delta scz$.

Accordingly, in the approach phase, when the aircraft A has a low incidence, in the operational field, the device 1 applies the deflection $\delta sbr$ which optimises (that is minimises) noise. Then, if incidence increases, the device 1 can apply the deflection $\delta scz$ which provides a maximum airlift for ensuring an optimum stall.

An incidence of protection onset is an incidence which is defined on an aircraft by a usual protection to be activated in cases of high incidences.

Besides, the calculation set 14B depicted in FIG. 4, which is provided for the takeoff phase, includes, besides elements identical to the elements explained above being part of said calculation set 14A:

a means 28, for example a memory, which supplies the optimum engine angle command $\delta sf$;

usual means 29 which monitor the engines of the aircraft A and which are able to detect a potential breakdown of one of said engines; and switching means 30 which are controlled by said means 29 and intended to connect the input of said computing means 24 to one of said means 25 and 28, in order to receive one of the optimum engine angle commands $\delta sbr$ and $\delta sf$.

In addition, $\alpha 1$ and $\alpha 2$ are substituted for $\alpha 3$ and $\alpha 4$.

More precisely:

in the absence of engine breakdown, the computing means 24 receives the optimum engine angle command $\delta sbr$ recorded in means 25, as depicted in FIG. 4; and when an engine breakdown is detected, it receives the optimum engine angle command $\delta sf$ supplied by means 28.

In accordance, in the embodiment of FIG. 4 which is implemented in a situation for which the current flight phase (determined by means 13) of the aircraft A is a takeoff phase, the device 1 determines and applies a current engine angle command $\delta sc$:

for an incidence $\alpha c$ lower than $\alpha 3$ value (corresponding for example to a usual incidence of protection onset), an optimum engine angle command providing the aircraft A with an aerodynamic configuration for:

in the absence of engine breakdown, optimising noise ($\delta sbr$); and upon a breakdown of an engine of the aircraft A, optimising fineness ($\delta sf$);

for an incidence $\alpha c$ higher than $\alpha 4$ value (which is higher than said $\alpha 3$ value, for example by a predetermined value), an optimum engine angle command $\delta scz$ providing the aircraft A with an aerodynamic configuration for optimising airlift; and for an incidence $\alpha c$ between said $\alpha 3$ and $\alpha 4$ values, a command $\delta sc$ which is between said above optimum engine angle commands.

When the aircraft A is in a normal takeoff phase, therefore with a moderate incidence and all the engines operating, the device 1 applies deflection $\delta sbr$ which optimises (that is minimises) noise. In contrast, when an engine breakdown is detected, the device 1 applies to the spoilers 6 the deflection δsf which provides the best fineness and therefore ensures the best lifting performance. Further, when incidence increases, it is expected to favour protection against stall (using δscz).

With the embodiment of FIG. 4, the same deflection change can be applied depending on the incidence, whether there is an engine breakdown or not.

Besides, the predetermined curves shown in FIGS. 3 and 4 individually include transitions in between optimum engine angle commands, which are continuous and preferably linear, such as to avoid a sudden modification of V value and therefore of the current engine angle command δsc to be applied.

The invention claimed is:

1. A process for automatic flight optimisation of an aerodynamic configuration of an aircraft (A) equipped with wings (3) which are provided with spoilers (6), process according to which, in an automatic fashion, I) the aircraft (A) is monitored to determine a current flight phase, and if the current flight phase corresponds to a particular predetermined flight phase, the following operations are performed:

II/a) an optimum engine angle commands are taken into account, each of which relates to the deflection of spoilers (6) and is optimised to provide the aircraft (A) with an aerodynamic configuration for optimising a particular parameter in said particular flight phase;

b) a current value of incidence (a) of the aircraft (A) is determined; and c) using this current value and said optimum engine angle commands, a correct engine angle command is determined which, when applied to said spoilers (6), provides the aircraft (A) with an optimum aerodynamic configuration for the current situation of the aircraft (A), said current engine angle command being determined using said current value of incidence (a) and a predetermined curve which shows the engine angle command as a function of incidence, said curve including optimum engine angle commands and transitions between such optimum engine angle commands, wherein, when said particular flight phase is an approach phase, the following is determined as the correct engine angle command:

for an incidence lower than a first predetermined value ($\alpha 1$), a first optimum engine angle command providing the aircraft (A) with an aerodynamic configuration for optimising noise;

for an incidence higher than a second predetermined value ($\alpha 2$) which is higher than said first predetermined value ($\alpha 1$), a second optimum engine angle command providing the aircraft (A) with an aerodynamic configuration for optimising airlift; and for an incidence between said first and second predetermined values ($\alpha 1$, $\alpha 2$), a command which is between said first and second optimum engine angle commands, and wherein, when said particular flight phase is a takeoff phase, the following is determined as the correct engine angle command:

for an incidence lower than a first predetermined value ($\alpha 3$), a first optimum engine angle command providing the aircraft (A) with an aerodynamic configuration for optimising noise, in the absence of any engine breakdown; and optimising fineness upon a breakdown of an engine of the aircraft (A);

for an incidence higher than a second predetermined value ($\alpha 4$) which is higher than said first predetermined value ($\alpha 3$), a second optimum engine angle command providing the aircraft (A) with an aerodynamic configuration for optimising airlift; and for an incidence between said first and second predetermined values ($\alpha 3$, $\alpha 4$), a command which is between said first and second optimum engine angle commands.

2. The process according to claim 1, wherein a step II/d) is further carried out, in which said correct engine angle command, determined in step II/c), is automatically applied to actuators (10) of the spoilers (6) of the aircraft (A).

3. The process according to claim 1, wherein:

the engines of the aircraft (A) are monitored in order to be able to detect a possible breakdown; and in case a breakdown of an engine of the aircraft (A) is detected, a particular optimum engine angle command is taken into account in step II/a).

4. The process according to claim 1, wherein said transitions are continuous and monotonic.

* * * * *